US010713080B1

(12) United States Patent
Brooker et al.

(10) Patent No.: US 10,713,080 B1
(45) Date of Patent: Jul. 14, 2020

(54) REQUEST-BASED VIRTUAL MACHINE MEMORY TRANSITIONING IN AN ON-DEMAND NETWORK CODE EXECUTION SYSTEM

(71) Applicant: Amazon Technologies, Inc., Seattle, WA (US)

(72) Inventors: Marc John Brooker, Seattle, WA (US); Mikhail Danilov, Sammamish, WA (US); Anthony Nicholas Liguori, Bainbridge, WA (US)

(73) Assignee: Amazon Technologies, Inc., Seattle, WA (US)

( * ) Notice: Subject to any disclaimer, the term of this patent is extended or adjusted under 35 U.S.C. 154(b) by 149 days.

(21) Appl. No.: 16/045,584

(22) Filed: Jul. 25, 2018

(51) Int. Cl.
*G06F 9/455* (2018.01)
*H04L 29/08* (2006.01)

(52) U.S. Cl.
CPC ............ *G06F 9/45558* (2013.01); *G06F 2009/45583* (2013.01); *H04L 67/02* (2013.01); *H04L 67/10* (2013.01)

(58) Field of Classification Search
CPC .................................................. G06F 9/45558
See application file for complete search history.

(56) References Cited

U.S. PATENT DOCUMENTS

2007/0204266 A1 * 8/2007 Beaty .................. G06F 9/45558
718/1
2017/0293501 A1 * 10/2017 Barapatre ........... G06F 9/45558

* cited by examiner

*Primary Examiner* — Charlie Sun
(74) *Attorney, Agent, or Firm* — Knobbe, Martens, Olson & Bear, LLP

(57) ABSTRACT

Systems and methods are described for selectively transitioning execution environments in an on-demand code execution system based on a timing of a next request to execute code within such environments. The system can predict, from a history of requests to the system, when a next call to execute code in an environment, such as a virtual machine instance, will occur. The system can then calculate and compare the relative costs of maintaining the environment in an executing state or of halting the environment and moving the environment to a lower tier of memory, each of which can be based on the predicted next call to execute code within the environment. If the relative cost of maintaining the environment in an executing state exceeds that of halting the environment and moving the environment to a lower tier of memory, the virtual machine is halted and transitioned to secondary memory.

20 Claims, 5 Drawing Sheets

US 10,713,080 B1

REQUEST-BASED VIRTUAL MACHINE MEMORY TRANSITIONING IN AN ON-DEMAND NETWORK CODE EXECUTION SYSTEM

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
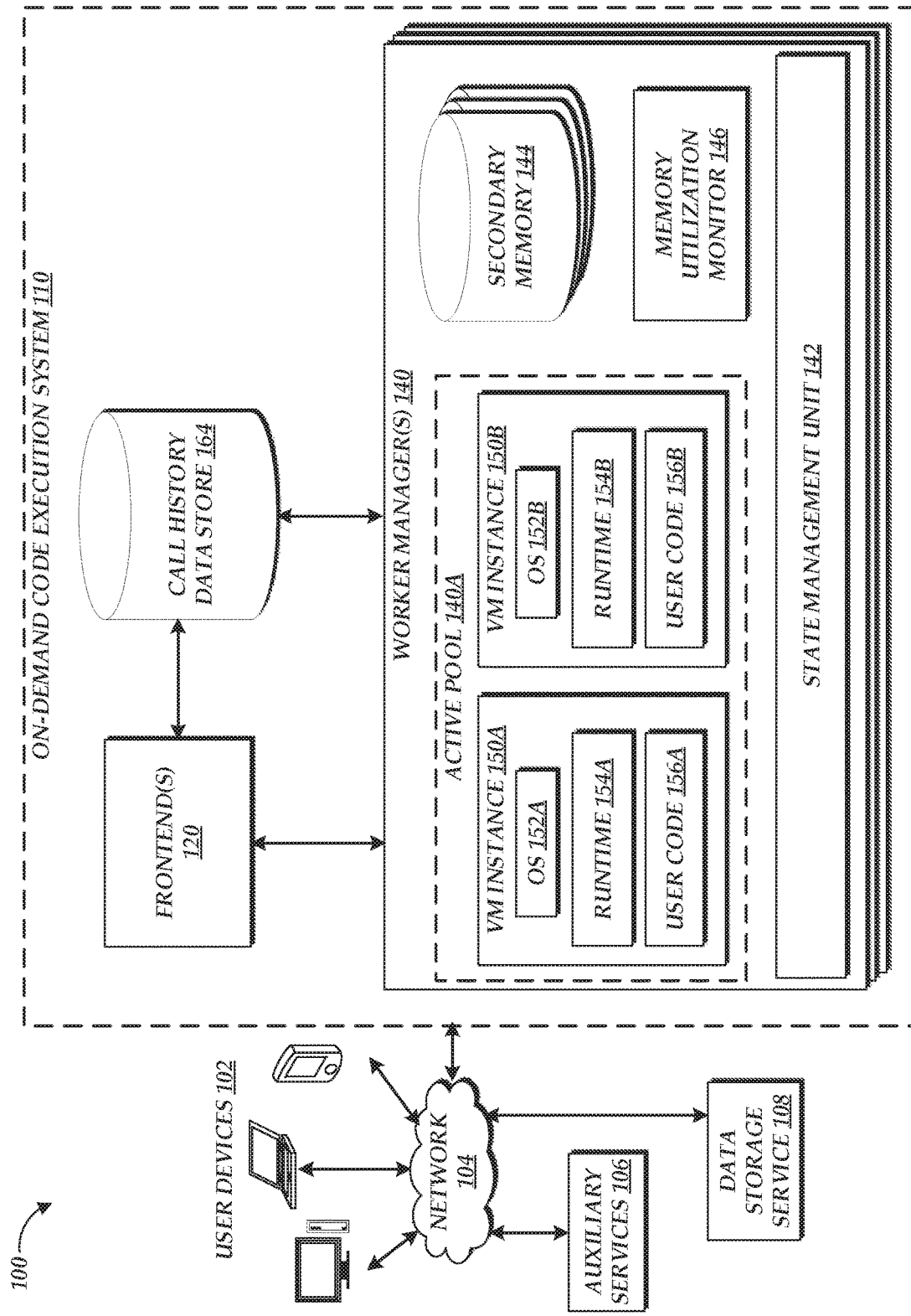
FIG. 1 is a block diagram depicting an illustrative environment in which an on-demand code execution system can operate to execute tasks corresponding to code, which may be submitted by users of the on-demand code execution system, and to transition execution environments into various memory states based on an expected timing of a next execution of such code.

Generally described, aspects of the present disclosure relate to an on-demand code execution system enabling rapid execution of code, which may be supplied by users of the on-demand code execution system. An on-demand code execution system may also be known as a "serverless" execution system or a request-drive code execution system. More specifically, embodiments of the present disclosure relate to managing memory states of execution environments on the on-demand code execution system, in a manner which reduces the computer resource usage of the system while maintaining the ability of the system to rapidly execute code in response to user requests.

As described in detail herein, the on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user).

The on-demand code execution system may implement a variety of technologies to enable rapid execution of code. Illustratively, the on-demand code execution system may be configured to maintain within a number of execution environments, such as virtual machine instances, software containers, or the like, in which code of a task may be provisioned and executed. In some instances, these execution environments may be currently executing on the on-demand code execution system, and thus execution of a task may require little more than provisioning the execution environment with code and executing that code. In other instances, these execution environments may not be executing, and thus execution of a task may also require initializing the environment (e.g., by launching a virtual machine instance, which may include loading an operating system, etc.). In general, maintaining an environment in an executing state can facilitate more rapid execution of a task, but also utilizes some amount of working computing resources of a host computing device, such as central processing unit (CPU) cycles and registers, random access memory (RAM), and the like. In contrast, maintaining an environment in a non-executing state (e.g., a shut down virtual machine instance), can utilize fewer or no working resources, and can instead utilize non-working resources (e.g., resources not required for currently executing processes) such as long term memory storage provided by a hard disk drive (HDD). However, maintaining an environment in a non-executing state may require that the environment first be initialized prior to executing a task within the environment, thus potentially delaying execution of the task.

To address this trade-off, embodiments of the on-demand code execution system can be configured to modify a memory state of an execution environment according to a next predicted execution of the task, such that the overall computing resource usage of the on-demand code execution system is reduced, and/or such that the on-demand code execution system can facilitate more executions of tasks within a given set of computing resources. Specifically, embodiments of the present disclosure enable the on-demand code execution system to utilize historical information regarding executions of tasks to predict, for a given task, when a next request to execute that task will occur. The on-demand code execution system may then place an execution environment for the task into a memory state based on that predicted next execution request. For example, where the next execution request is expected to occur shortly, the on-demand code execution system may maintain an environment for the task in an executing state, such as within RAM or other primary memory of a host device. Conversely, when the next execution request is expected to occur at a significantly later time, the on-demand code execution system may maintain the environment for the task in a non-executing state within a secondary memory, such as a hard disk drive. Because secondary memory is generally more readily available within a host device than primary memory, and because maintaining an environment in a non-executing state generally minimizes or negates load on processing resources of a host (e.g., a CPU), maintaining an environment within secondary memory can reduce computing resource usage of a host device and free those resources for use in executing other tasks, thus improving the efficiency of the on-demand code execution system overall.

In some instances, a host device of the on-demand code execution system may have access to multiple levels of secondary memory, in addition to a primary memory (e.g., RAM). For example, a host device may have access to very rapid non-volatile memory, such as 3D XPOINT™ memory, developed by Intel Corporation (which memory implements a specific technology architecture generally classified as a type of resistive random-access memory, or "ReRAM"), relatively less rapid flash storage (e.g., within a solid state disk (SSD) drive), relatively less rapid magnetic storage memory (e.g., within an HDD), and still relatively less rapid non-local storage (e.g., a network-attached storage, or "NAS," which may be implemented by any of a variety of physical memory storage devices, including the preceding memory device types). In general, the speed of memory (e.g., in terms of bandwidth) can be expected to be inversely proportional to the amount of such memory available. Thus, 3D) (POINT memory is expected to be less available than flash storage, which is expected to be less available than magnetic storage, etc. As used herein, the term "lower tier" memory is generally intended (unless noted to the contrary) to refer to memory with lower speed but greater expected availability than a "higher tier" memory, which in turn is generally intended to refer to memory with higher speed and lower expected availability. As such, transitioning an execution environment to a lower tier of memory is generally expected to reduce the resource usage of the on-demand code execution system in maintaining that environment, while at the same time increasing the time required to initialize the environment such that a task may be executed within the environment. As will be discussed below, the on-demand code execution system can therefore be configured to transition an environment to a lowest tier memory possible while still maintaining the ability of the on-demand code execution system to rapidly execute a task within the environment based on a predicted next request to execute the task.

In one embodiment, a predicted next request to execute a task may be based on historical information regarding the task. Illustratively, if requests to execute a task have historically (e.g., over a past period of time, such as a day, week, month, year, etc.) occurred at a set frequency of once per minute, the on-demand code execution system may expect that a next request to execute the task will occur one minute after a prior request. This illustrative example may occur when an external system, such as a web service, has been configured to call to the on-demand code execution system for execution of a task at the set frequency. In some instances, the on-demand code execution system may be configured to calculate an expected range of time until a next request to execute a task based on historical information. For example, the on-demand code execution system may apply common statistical techniques to calculate a mean or median predicted time until a next execution, or a standard deviation of a distribution of times between requests to execute the code. As a further example, the on-demand code execution system may calculate an interquartile range of a historical distribution of times between calls to execute a task, and use this range (along with a known last call to execute the task) to predict when a next call to execute a task will occur. In other embodiments, the on-demand code execution system may utilize other inputs to predict a next expected request to execute a task. For example, where little or no history exists for a given task, the on-demand code execution system may instead utilize request histories of similar tasks to calculate the next expected request to execute the given task. Similar tasks may be identified, for example, based on length of source code for the task, functions called within the code, libraries utilized by the task, a type of environment (e.g., operating system or runtime environment) for the task, and the like. In some embodiments, the on-demand code execution system may have more specific knowledge of the next expected request to execute a task. For example, a creator of a task may explicitly ask that the on-demand code execution system execute the task at a set frequency, thus enabling the on-demand code execution system to determine with great accuracy when a next execution of the task will occur.

In one embodiment, the on-demand code execution system is configured, on detecting an idle execution environment for a task in a primary memory (e.g., after execution of the task within the environment), to transition the environment to a lowest tier memory which would still enable the environment to be transitioned back to an executing state prior to a time of a next expected request to execute the task. For example, where a next expected request to execute a task in an environment is one minute in the future, and transitioning an environment to a given tier of secondary memory and back into primary memory is expected to take 50 seconds of time (e.g., 25 seconds to halt execution and transition to secondary memory and the same amount of time to transition to primary memory and initialize the environment), the on-demand code execution system may be configured to conduct that transition, thus "freeing up" an amount of primary memory supporting execution of the environment for ten seconds of time. (The amount freed in practice would exceed this, as some amount of primary memory would be expected to become available even before transitioning of the environment out of primary memory completes, and some amount would be expected not to be utilized until transitioning of the environment back to primary memory completes.)

While the above example may reduce overall usage of the primary memory, this example may not be desirable for the on-demand code execution system overall, as transitioning execution environments to secondary memory may also incur costs in terms of resource usage. Illustratively, in the example above, transitioning an environment from primary memory to secondary memory over a period of 25 seconds may utilize both the secondary memory and bandwidth of a communication bus between the primary and secondary memory. These other resources (the secondary memory and communication bus) may also support other operations of the on-demand code execution system. Thus, while transitioning an environment to secondary memory may free up a portion of the primary memory for a ten second period, it may also incur costs in terms of use of the secondary memory and the communication bus.

To address concern, embodiments of the present disclosure may calculate an expected cost (e.g., in terms of usage of computing resources) associated with maintaining an execution environment in a primary memory, as well as expected costs for transitioning the environment to each potential secondary memory (e.g., in terms of both usage of the secondary memory and usage of resources, such as a communication bus, to move the environment to the secondary memory). Each cost may be based at least partly on a timing of a next expected request to execute a task within the environment. The on-demand code execution system may thereafter transition the environment to a memory tier with a lowest expected overall cost to the on-demand code execution system.

In one embodiment, the execution environments managed by the on-demand code execution system correspond to virtual machine instances. To transition such instances from an executing to non-executing state, the on-demand code execution system may utilize "snapshots" of such virtual machine instances. Snapshotting of virtual machines is a known technique, and thus will not be described in detail herein. However, in brief, snapshotting may generate a data file which stores a state of a virtual machine instance at a point in time, including state elements such as a content of CPU registers of the virtual machine instance, contents of RAM of the virtual machine instances, states of pages within RAM (e.g., as "dirty" or "clean"), and any other information required to return the virtual machine instances to its prior state at a later point in time. Thus, as will be described below, the on-demand code execution system may be configured to modify a memory state of a virtual machine instance from primary memory to secondary memory by snapshotting a current state of the instances, and placing that snapshot into secondary memory. The on-demand code execution system may further modify a memory state of a virtual machine instance from a secondary memory to primary memory by utilizing the snapshot to reinitialize the virtual machine image in an executing state.

As will be appreciated by one of skill in the art in light of the present disclosure, the embodiments disclosed herein improves the ability of computing systems, such as on-demand code execution systems, to execute code in an efficient manner. Specifically, embodiments of the present disclosure increase the efficiency of computing resource usage of such systems by enabling execution environments to be transitioned to lower tier memory, while maintaining the ability of such systems to execute code rapidly in response to requests to do so. Moreover, the presently disclosed embodiments address technical problems inherent within computing systems; specifically, the limited nature of computing resources with which to execute code and the inefficiencies caused by maintaining unutilized environments in an executing state. These technical problems are addressed by the various technical solutions described herein, including the selective transitioning of environments to lower tier memories based on a time until a next expected utilization of such an environment. Thus, the present disclosure represents an improvement on existing data processing systems and computing systems in general.

The general execution of tasks on the on-demand code execution system will now be discussed. As described in detail herein, the on-demand code execution system may provide a network-accessible service enabling users to submit or designate computer-executable source code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

Specifically, to execute tasks, the on-demand code execution system described herein may maintain a pool of executing virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute the program code of a user (a "task"), which specifies one or more computing constraints for executing the program code of the user, the on-demand code execution system may select a virtual machine instance for executing the program code of the user based on the one or more computing constraints specified by the request and cause the program code of the user to be executed on the selected virtual machine instance. The program codes can be executed in isolated containers that are created on the virtual machine instances, or may be executed within a virtual machine instance isolated from other virtual machine instances acting as environments for other tasks. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) can be significantly reduced.

Because the number of different virtual machine instances that a host computing device may execute is limited by the computing resources of that host (and particularly by highly utilized resources such as CPU cycles and RAM), the number of virtual machine instances in a pool on the on-demand code execution system is similarly limited. Thus, in accordance with the embodiments of the present disclosure, the on-demand code execution system may generate execution environments for a large number of tasks (e.g., more environments than could be maintained as executing on the on-demand code execution system at a given point in time), and transition a subset (e.g., a majority) of those environments into lower tier memory storage, based on a next expected utilization of each environment. Thus, a primary memory of the on-demand code execution system can be expected to hold environments either being actively used or expected to be used in a very short amount of time. As environments within the primary memory become idle, the on-demand code execution system can transition the environments to secondary memory based on future expected use, and move into primary memory those environments which are next expected to be used. In this manner, the overall efficiency of primary memory within the on-demand code execution system is increased.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102, auxiliary services 106, and network-based data storage services 108. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLIs), application programming interfaces (APIs), and/or other programmatic interfaces for generating and uploading user-executable code (e.g., including metadata identifying dependency code objects for the uploaded code), invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the one-demand code execution environment 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. For example, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontend

120 (which may in some instances represent multiple frontends 120) may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, and as described in more detail below, the on-demand code execution system 110 may configure the virtual machine instances with customized operating systems to execute the user's code more efficiency and reduce utilization of computing resources.

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. As noted above, the code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task (which may also be referred to as a request to execute the task) may specify one or more third-party libraries (including native libraries) to be used along with the user code corresponding to the task. In one embodiment, the call may provide to the on-demand code execution system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further include an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

In some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the active pool 140A described below, the load balancer may distribute calls according to the capacities or loads on those other components. Calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. For example, calls may be distributed to load balance between frontend 120. Other distribution techniques, such as anycast routing, will be apparent to those of skill in the art.

The on-demand code execution system further includes one or more worker managers 140 that manage the execution environments, such as virtual machine instances 150 (shown as VM instance 150A and 150B, generally referred to as a "VM"), used for servicing incoming calls to execute tasks, and that manage the memory states of execution environments. While the following will be described with reference to virtual machine instances 150 as examples of such environments, embodiments of the present disclosure may utilize other environments, such as software containers. In the example illustrated in FIG. 1, each worker manager 140 manages an active pool 140A, which is a group (sometimes referred to as a pool) of virtual machine instances 150 executing on one or more physical host computing devices that are initialized to execute a given task (e.g., by having the code of the task and any dependency data objects loaded into the instance). The active pool 140 illustratively is implemented using primary memory (e.g., RAM) of host devices implementing or under control of the worker manager 140.

Although the virtual machine instances 150 are described here as being assigned to a particular task, in some embodiments, the instances may be assigned to a group of tasks, such that the instance is tied to the group of tasks and any tasks of the group can be executed within the instance. For example, the tasks in the same group may belong to the same security group (e.g., based on their security credentials) such that executing one task in a container on a particular instance 150 after another task has been executed in another container on the same instance does not pose security risks. As another example, the tasks of the group may share common dependencies, such that an environment used to execute one task of the group can be rapidly modified to support execution of another task within the group.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

Thereafter, the worker manager 140 may modify a virtual machine instance 150 (if necessary) and execute the code of the task within the instance 150. As shown in FIG. 1, respective instances 150 may have operating systems (OS) 152 (shown as OS 152A and 152B), language runtimes 154 (shown as runtime 154A and 154B), and user code 156 (shown as user code 156A and 156B). The OS 152, runtime 154, and user code 156 may collectively enable execution of the user code to implement the task. In some instances, each VM 150 may be associated with additional information, such as state information, maintained across individual executions of a task. For example, when initially created, a VM 150 may initialize the OS 152, and each time the user code 156 is executed in the VM 150, a state of the VM 150 may change. State of a VM 150 may be maintained, for example, within registers of a virtual CPU of the VM 150, within RAM of the VM 150, within a virtual disk drive of the VM 150, or the like.

In accordance with embodiments of the present disclosure, the worker manager 140 further includes a state management unit 142, configured to manage a state of the VMs 150. Specifically, the state management unit 142 may be configured to detect an idle VM 150 within the active pool 140A and to determine, based on an expected next use of that VM 150, whether to transition the VM 150 to a secondary memory 144. The secondary memories 144 can correspond to one or more lower tier memories, which are less rapid than primary memory, but which are illustratively greater in capacity. The secondary memories 144 can correspond, for example, to 3D XPOINT, flash memory, magnetic storage, or network-attached storage. Specifically, the state management unit 142 can be configured to calculate a next expected use of a VM 150 (e.g., when a next request to execute a task within the VM 150 will be received), and to calculate both (i) a cost of maintaining the VM 150 within the active pool 140A until that next expected use and (ii) a cost of transitioning the VM 150 to one of the secondary memories 144 and back into the active pool 140A so that it is available at the time of the next expected use. If the cost of transitioning the VM 150 into a secondary memory 144 is less than a cost of maintaining the VM 150 within the active pool 140A, the state management unit 142 can transition the VM 150 into the secondary memory 144. The state management unit 142 can later transition the VM 150 back into the active pool 140A as required to service a next request to execute a task in the VM 150. For example, the state management unit 142 may time a transition of the VM 150 from the secondary memory 144 to the active pool 140A such that the transition completes at or just prior to an expected time of the request. In instances where a request is received before that expected time, the state management unit 142 may transition the VM 150 earlier, such as immediately (e.g., on receive of the request) or as space is available within the active pool 140A.

To assist in transitioning of VMs 150 between active 140A and secondary memory 144, the worker manager 140 of FIG. 1 further includes a memory utilization monitor 146, configured to monitor memory utilization of various VMs 150 on the worker manager 140 (e.g., on one or more host devices implementing the worker manager 140). In one embodiment, the memory utilization monitor 146 monitors the memory utilization of a VM 150 within a primary memory of the worker manager 140. In another embodiment, the memory utilization monitor 146 monitors an amount of difference (or "delta") between a memory of a VM 150 in primary memory of the worker manager 140 and a representation of that VM 150 within secondary memory 144. For example, in some embodiments, the worker manager 140 may maintain in secondary memory 144 a snapshot (or other data representation) of a VM 150, even when that VM 150 is executing within the active pool 140A. Illustratively, the snapshot may have been previously utilized to generate the VM 150 within the active pool 140A. The memory state of the VM 150 within the active pool 140A and the snapshot of the VM 150 in the secondary memory 144 may include a substantial amount of information. For example, a VM 150 may be loaded with a runtime 154 which, on initialization, utilizes a given set of memory space (e.g., 100 megabytes). When executing user code 156 in the runtime 154, some subset of that memory space may be modified based on execution of the user code (e.g., 10 megabytes). This memory utilized during execution of a task can represent the "working set" of memory of the task. Thus, if a snapshot of the VM 150 is taken just after initialization and prior to execution of user code 156, the snapshot and a state of the VM 150 after execution of a task would be expected to overlap by 90 megabytes (the initial utilization minus the working set). Due to this overlap, a new snapshot of the VM 150 after execution of a task may be created in the secondary memory 144 based on transferring out of the working set of the VM 150 within the active pool 140A, without requiring that all memory of the VM 150 be transferred from the active pool 140A. The remaining memory of the VM 150 may be identified by reference to the preexisting snapshot of the VM 150. Such interdependent snapshots are generally referred to as "cascading snapshots." Thus, the memory utilization monitor 146 in one configuration of the system 110 tracks the "delta" of data needed to transition a VM 150 from the active pool 140A to a secondary memory 144.

As noted above, the state management unit 142 can be configured to determine when to transition a VM 150 to secondary memory 144 based on a next expected utilization of the VM 150 to execute a task. To facilitate determination of the next expected utilization, the system 110 further includes a call history data store 164, which stores information regarding a history of calls to the system 110 of tasks. Illustratively, each time the frontend 120 receives a call to execute a task, the frontend 120 may update a record within the call history data store 164 (e.g., within a database) to reflect that call. The state management unit 142 may utilize the call history of a task to predict a next execution of that task or similar tasks. In some instances, the state management unit 142 may generate statistical information regarding the call history of a task, such as a median or mean duration between calls, a standard deviation of that duration, an interquartile range of that duration, or the like. Such statistical information may also be stored within the call history data store 164. The call history data store 164 may correspond to any persistent or substantially persistent data storage device, including (but not limited to) hard disk drives, solid state disk drives, network attached storage, etc., or any combination thereof.

While some functionalities are generally described herein with reference to an individual component of the on-demand code execution system 110, other components or a combination of components may additionally or alternatively implement such functionalities. For example, while each worker manager 140 is depicted in FIG. 1 as including a state management unit 142, in some instances, one or more centralized state management units 142 may be provided which provide access to the above-described functionalities to multiple worker managers 140. In instances where the worker manager 140 is implemented across multiple host devices, each host device may include a state management unit 142, or multiple devices may share access to a common state management unit 142 (e.g., executed on a physically nearby device, such as a device on the same "rack" within a data center). In some instances, the call history data store 164 may be implemented locally within a worker manager 140. For example, where each worker manager 140 is configured to handle a specific subset of tasks on the system 140, each worker manager 140 may maintain a call history of that specific subset of tasks. Thus, the specific configuration of elements within FIG. 1 is intended to be illustrative.

Figure 2:
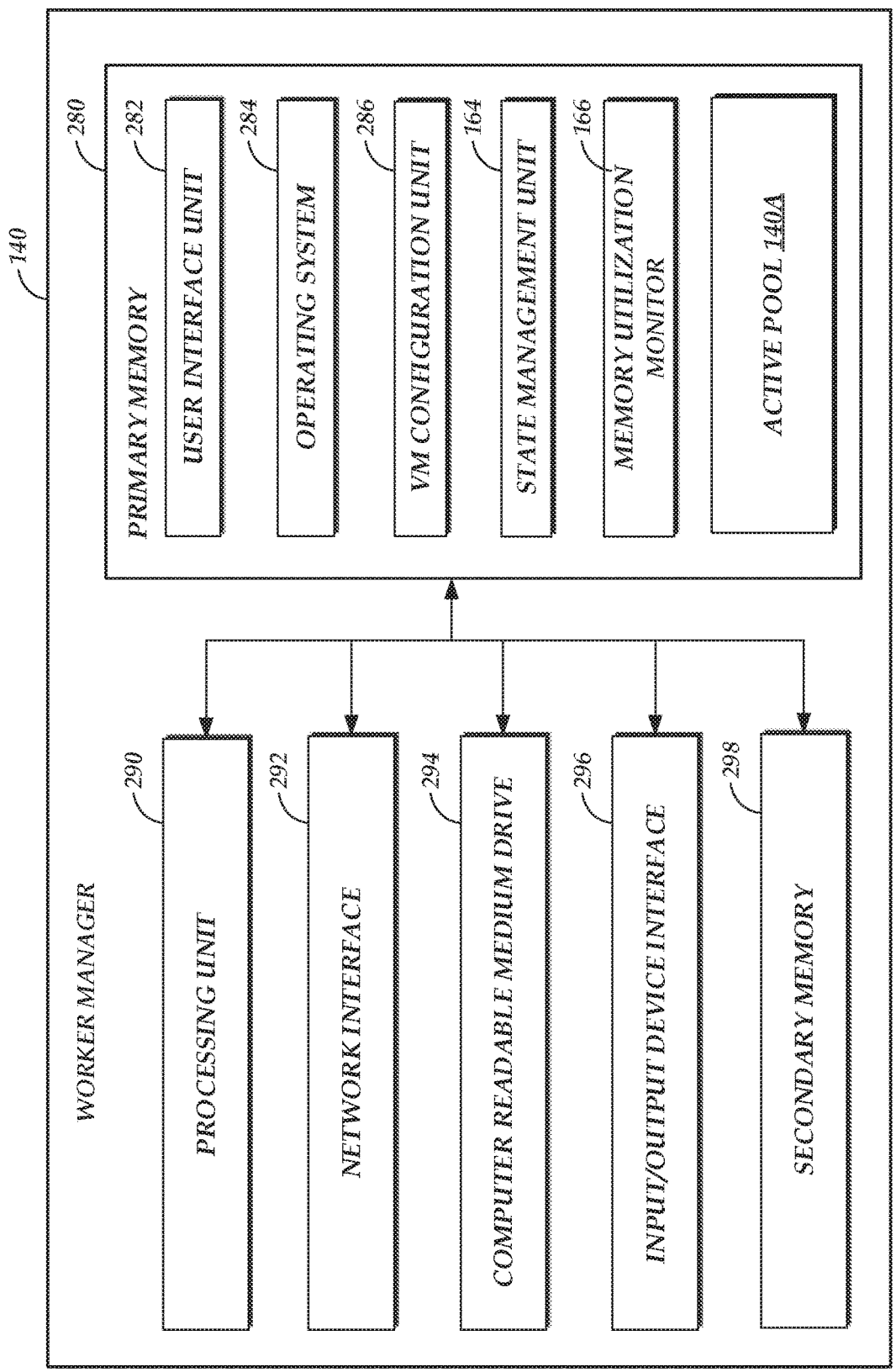
FIG. 2 depicts a general architecture of a computing device providing a worker manager on the on-demand code execution system of FIG. 1, which may function to manage a memory state of an execution environment based on an expected timing of a next execution of code provisioned within the execution environment.

FIG. 2 depicts a general architecture of a computing system implementing a worker manager 140 of FIG. 1. The general architecture of the worker manager 140 depicted in FIG. 2 includes an arrangement of computer hardware and software that may be used to implement aspects of the present disclosure. The hardware may be implemented on physical electronic devices, as discussed in greater detail below. The worker manager 140 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the worker manager 140 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from primary memory 280 and/or secondary memory 298 and further provide output information for an optional display (not shown) via the input/output device interface 296. The input/output device interface 296 may also accept input from an optional input device (not shown).

The primary memory 280 and/or secondary memory 298 may contain computer program instructions (grouped as units in some embodiments) that the processing unit 290 executes in order to implement one or more aspects of the present disclosure. These program instructions are shown in FIG. 2 as included within the primary memory 280, but may additionally or alternatively be stored within secondary memory 298. The primary memory 280 and secondary memory 298 correspond to one or more tiers of memory devices, including (but not limited to) RAM, 3D XPOINT memory, flash memory, magnetic storage, and the like. The primary memory 280 is assumed for the purposes of description to represent a main working memory of the worker manager 140, with a higher speed but lower total capacity than secondary memory 298. As noted above, the secondary memory 298 may include multiple tiers of memory, each lower representing a progressively lower speed but potentially higher capacity than a prior tier.

The primary memory 280 illustratively includes the active pool 140A, which may store information regarding virtual machine instances that are actively executing on the worker manager 140. While shown as part of primary memory 280, use of the term "active pool" may in some instances also refer to a logical construct including the VMs 150 executing on a worker manager 140. These VMs 150 within the active pool 140A may additionally utilize other resources of the worker manager 140, such as the processing unit 290, the network interface 292, etc. Thus, inclusion of the "active pool 140A" within primary memory 280 is intended to visually represent a portion of the primary memory 280 utilized by VMs 150 within the active pool 140A, and not as an indication that such VMs 150 solely utilize the primary memory 280.

The primary memory 280 may further store an operating system 284 that provides computer program instructions for use by the processing unit 290 in the general administration and operation of the sidecar configuration system 160. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device. In addition, the memory 280 may include and/or communicate with one or more data repositories (not shown), for example, to access user program codes and/or libraries.

In addition to and/or in combination with the user interface unit 282, the memory 280 may include a virtual machine configuration unit 162, state management unit 164, and memory utilization monitor 166. In one embodiment, the virtual machine configuration unit 162, state management unit 164, and memory utilization monitor 166 individually or collectively implement various aspects of the present disclosure, e.g., generating virtual machine instances in which to execute code in response to requests for such execution, monitoring memory usage of such machines within the primary memory 280, and selectively transitioning VMs 150 out of primary memory 280 and into secondary memory 298 based on a next expected use of the VM 150 to execute a task within the system 110.

The worker manager 140 of FIG. 2 is one illustrative configuration of such a device, of which others are possible. For example, while shown as a single device, a worker manager 140 may in some embodiments be implemented as multiple physical host devices. Illustratively, a first device of such a worker manager 140 may implement "control plane" functions, such as receiving requests to execute tasks, instructing when to transition VMs 150 between memory states, and the like, while a second device may house the active pool 140A and implement "data plane" operations, such as executing code in response to instructions by the first device.

In some embodiments, the worker manager 140 may further include components other than those illustrated in FIG. 2. For example, the primary memory 280 may further include a container manager for managing creation, preparation, and configuration of containers within virtual machine instances. Further variations on functionalities of a worker manager 140, any of which may be implanted by the worker manager 140 of the present disclosure, are described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 patent"), the entirety of which is hereby incorporated by reference.

Figure 3:
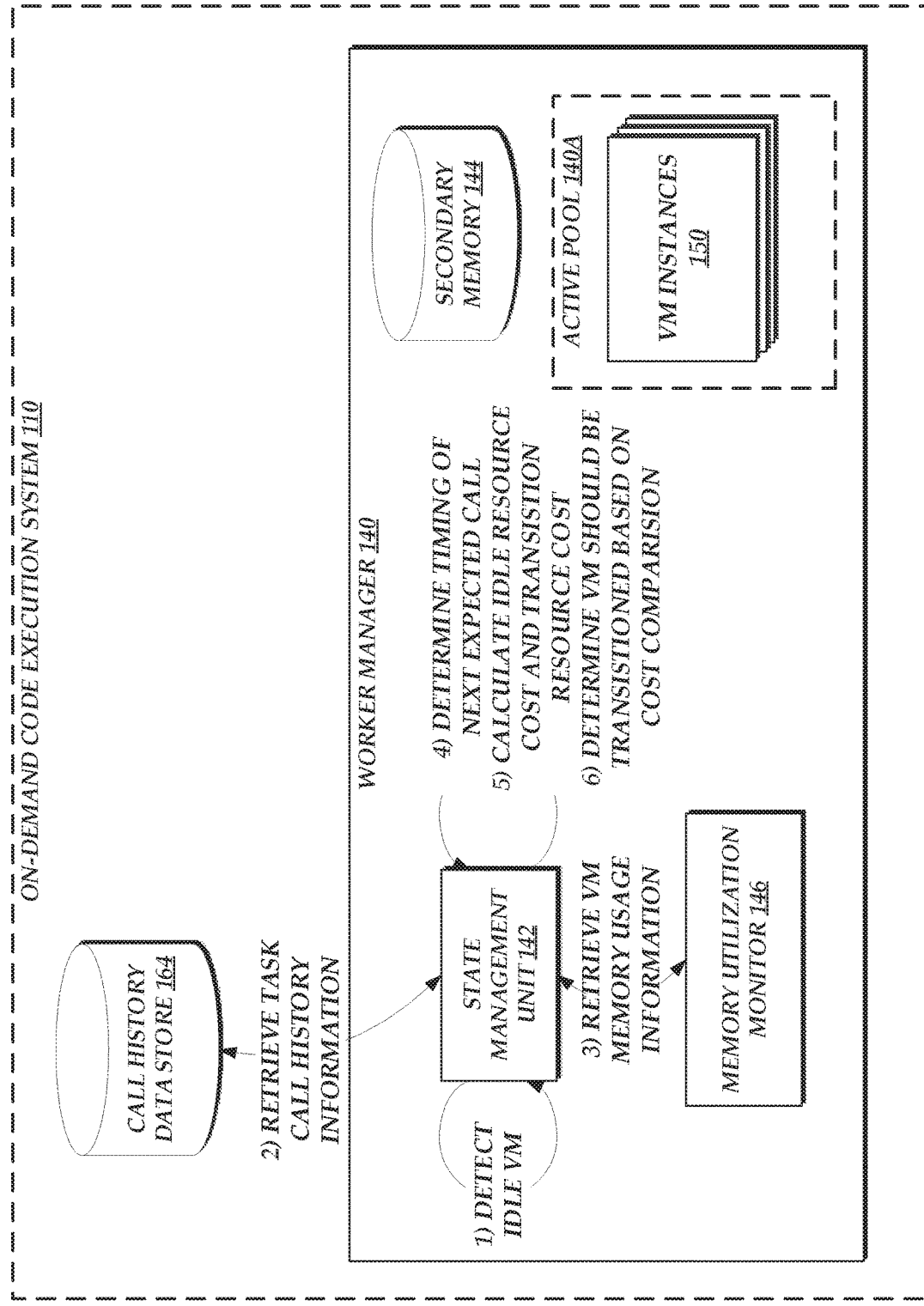
FIG. 3 is a flow diagram depicting illustrative interactions for determining a memory state in which an execution environment should be placed based on an expected timing of a next execution of code provisioned within the execution environment of the on-demand code execution system of FIG. 1.

With reference to FIG. 3, illustrative interactions are depicted for determining whether to transition the memory state of a VM 150 based on a next expected use of the VM 150 to execute a task. The interactions of FIG. 3 begin at (1), where the state management unit 142 detects an idle VM 150. In the present description, an idle VM 150 is intended to refer to a VM 150 that is not actively servicing a request to execute a task, such as by executing code of that task. For ease of description, it will be assumed with reference to FIG. 3 that each VM 150 is dedicated to execution of a single task. However, the interactions of FIG. 3 may be modified to include VMs 150 made available to execute multiple tasks (e.g., of the same user, utilizing the same libraries, etc.). Illustratively, the state management unit 142 may detect an idle VM 150 by receiving an indication that the VM 150 has completed execution of a task, and determining that no outstanding requests for execution of that task exist on the worker manager 140.

Thereafter, at (2) and (3) (which interactions are described in sequence but may be implemented concurrently, in parallel, in the reverse order, etc.), the state management unit retrieves task call history information from the call history data store 164, and VM memory usage information from the memory utilization monitor 146, respectively. As noted above, the task call history information may include a record of requests to execute a task (or one or more similar tasks) and/or statistical information related to such a record. The VM memory usage information can include a current amount of primary memory utilized by a VM 150, and/or a delta indicating how much information must be transitioned out of primary memory to transition the VM 150's state.

At (5), the state management unit 142 determines a timing of a next expected call to execute a task within the VM 150, based on the call history information. In instances where the call history information shows variations in the durations between calls, the state management unit can use a statistical measurement to calculate an expected time until a next call to execute the task. In one embodiment, the expected time is calculated based on a probability that, if a next call conforms to the distribution of past calls, that the next call will occur no earlier than a given point in time. Illustratively, a statistical analysis of the call history information may indicate that there is a 99% chance according to the historical distribution of calls that a next call occurs no earlier than 10 seconds from the current point in time, a 90% chance that the next call occurs no earlier than 30 seconds from the current point in time, a 50% chance that the next call occurs no earlier than 60 seconds from the current point in time, etc. As such, the worker manager 140 may be configured to utilize such a probability threshold to establish an expected timing of a next call. For example, the worker manager 140 may be configured to utilize an expected timing such that there is a predicted n % chance that the next call occurs no earlier than the expected timing. In some instances, the specific percentage may vary based on a user associated with the task executed within the VM 150 at issue. For example, specific users may require very low latency completion of requests, and thus may establish a high percentage value for calculating a next expected call. This can generally reduce the expected timing of a next call, and inhibit transferring of a VM 150 out of the active pool 150. Conversely, other users may not require low latency completion of requests, and may thus establish a low percentage value for calculating a next expected call, leading to more aggressive transferring of a VM 150 to secondary memory 144. In either instance, should a request to execute a task come before the next expected utilization, the worker manager 140 can transition the VM 150 out of secondary memory 144 at the time of the request. Thus, such requests may still be serviced, but may incur additional latency due to the need to transition the VM 150 out of secondary memory 144 at the time of the request.

At (4), the state management unit 142 calculates expected costs for maintaining the VM 150 within the active pool 140A, as well as for transitioning the VM 150 into a secondary memory 144. Generally described, the cost of maintaining a VM 150 within the active pool can be calculated as a sum of the resources of the worker manager 140 to maintain the VM 150 within the active pool 140A for the period of time until a next expected call to execute a task within the VM 150. For example, where an executing VM 150 within the active pool utilizes CPU cycles and RAM, the cost of maintaining the VM 150 within the active pool 140A can represent a combination of total CPU cycles expected to be utilized until the next expected call and a metric reflecting RAM usage over time (e.g., "megabyte-seconds"). The worker manager 140 can be configured to weight each metric according to a relative scarcity of the corresponding resource, and combine the metrics via a weighted linear equation. For example, where a worker manager 140 has excess CPU cycles but limited RAM, the metric of RAM usage over time may be weighted more highly than CPU cycles. A combination of these two metrics (potentially along with other metrics reflecting other resources used by an executing VM 150) can represent the cost of maintaining the VM 150 within the active pool.

Similarly, the cost of transitioning a VM 150 to secondary memory 144 can reflected a weighted combination of the resources needed to transition the VM 150 to the secondary memory 144 from the active pool, and later to transition the VM 150 back from the secondary memory 144 to the active pool to service a next expected request. Such resources can include (but are not limited to) the amount of primary memory used over time to transition the VM 150 in or out of the primary pool, the amount of a communication bus to transition the VM 150 (e.g., the bandwidth over time, which may in some instances be represented as a total amount of data transferred over the bus), and the amount of secondary memory 144 used over time to store the VM 150 within the secondary memory 150. Each resources may be weighted according to the relative scarcity of the resource within the worker manager 140. The total expected use of each resource may further be based on the expected timing of each phase of a transition of a VM 150 into secondary memory 144, including a transition-out phase (e.g., using resources of a primary memory, a secondary memory 144, and a communication bus between the two to transition a VM 150 from the active pool 144 to the secondary memory 144), an idle phase (e.g., using resources of the secondary memory 144 to maintain the VM 150 in the secondary memory 144), and a transition-in phase (e.g., using resources of a primary memory, a secondary memory 144, and a communication bus between the two to transition a VM 150 from the secondary memory 144 to the active pool 144). The worker manager 140 can determine an expected timing of transition-in or transition-out phases based on a theoretical or observed timing of transfer of data between primary and secondary memories, as well as the amount of data needed to be transferred to transfer the VM 150. For example, where 10 megabytes of data is required to be moved between a primary memory and a secondary memory 144 to transfer a VM, and a communication bus between those two memories has an expected speed of 1 gigabyte per second (GB/s) (which may be determined either based on specification of the bus or based on historical observation of bus speed with respect to VM data), the expected transfer-out time may be one one-hundredth of a second (1 GB/s divided by 10 MB).

As noted above, the total amount of data required to transition out a VM 150 can be reduced by maintaining a prior snapshot of a VM 150 within secondary memory 144, and transitioning only a "delta" representing a difference of a currently executing version of that VM 150. Such a technique is generally not suitable for reducing the amount of data required to transition a VM 150 back into the active pool 140A, as a goal of the current technique is to reduce resource usage of the active pool 140A. However, in many instance, it may not be necessary for all data of a VM 150 to be transitioned from secondary memory 144 to primary memory in order for the VM 150 to execute within the active pool 140A. Rather, only a minimum portion of that data (e.g., a state of CPU registers) may be transitioned initially in order to facilitate execution of the VM 150. The remaining data may be transitioned "on read" of the data during execution of a task. For example, as a VM 150 attempts to read a portion of data in virtualized RAM of the VM 150, that portion of data may be moved from secondary memory 144 to a primary memory of the worker manager 140, and passed to the VM 150. Using this technique, the cost of transitioning a VM 150 from secondary memory 144 to the active pool 140A may be reduced considerably. For example, embodiments of the present disclosure may assume, for the purposes of calculating a cost of transitioning a VM 150 into the active pool 140A, only the minimum resources needed to facilitate execution of the VM 150. The worker manager 140 may further predict a timing of this "transfer-in" transition as a latest point, before the expected next request, at which the phase-in can occur such that at the time of the expected next request, the VM 150 is executing within the active pool 140A and ready to execute the task.

The resource cost during the "idle" phase of a transition to secondary memory 144 can be calculated as the amount of secondary memory 144 needed to maintain the VM 150 in an inactive state during the period until the next expected request, subtracting the timing expected to be required for the transfer in and transfer out phases. This idle time cost can be weighted according to the resources used and combined with weighted representations of the transfer in and transfer out phase costs to result in a calculated cost of transitioning the VM 150 into secondary memory 144.

In the instance that the worker manager 140 includes multiple tiers of secondary memory 144, the above-noted costs can be calculated for each available tier of secondary memory 144. In general, the cost of resources of each lower tier of secondary memory 144 is expected to be lower (given the expected greater availability of such resources), but the time required to transition in and out a VM 150 from such memory is expected to be higher. Thus, larger more frequently used VMs 150 may incur minimal costs when transitioned to higher tier memories 144, while smaller less frequently used VMs 150 may incur minimal costs when transitioned to lower tier memories 144.

At (6), the state management unit 142 compares the previously calculated costs, and determines a desired memory state of a VM 150 based on a minimal calculated cost. Illustratively, where the cost of keeping a VM 150 idle within the active pool 140A is lower than the costs of transitioning the VM 150 to a secondary memory 144, the state management unit 142 can determine that the VM 150 should remain within the active pool 140A. For the purposes of description, it is assume that at (6) the state management unit 142 determines that a cost of transitioning the VM 150 to a secondary memory 144 is less than the cost of keeping the VM 150 idle within the active pool 140A. Thus, at (6), the state management unit 142 determines that the VM should be transitioned out of the active pool 140A and into secondary memory.

Figure 4:
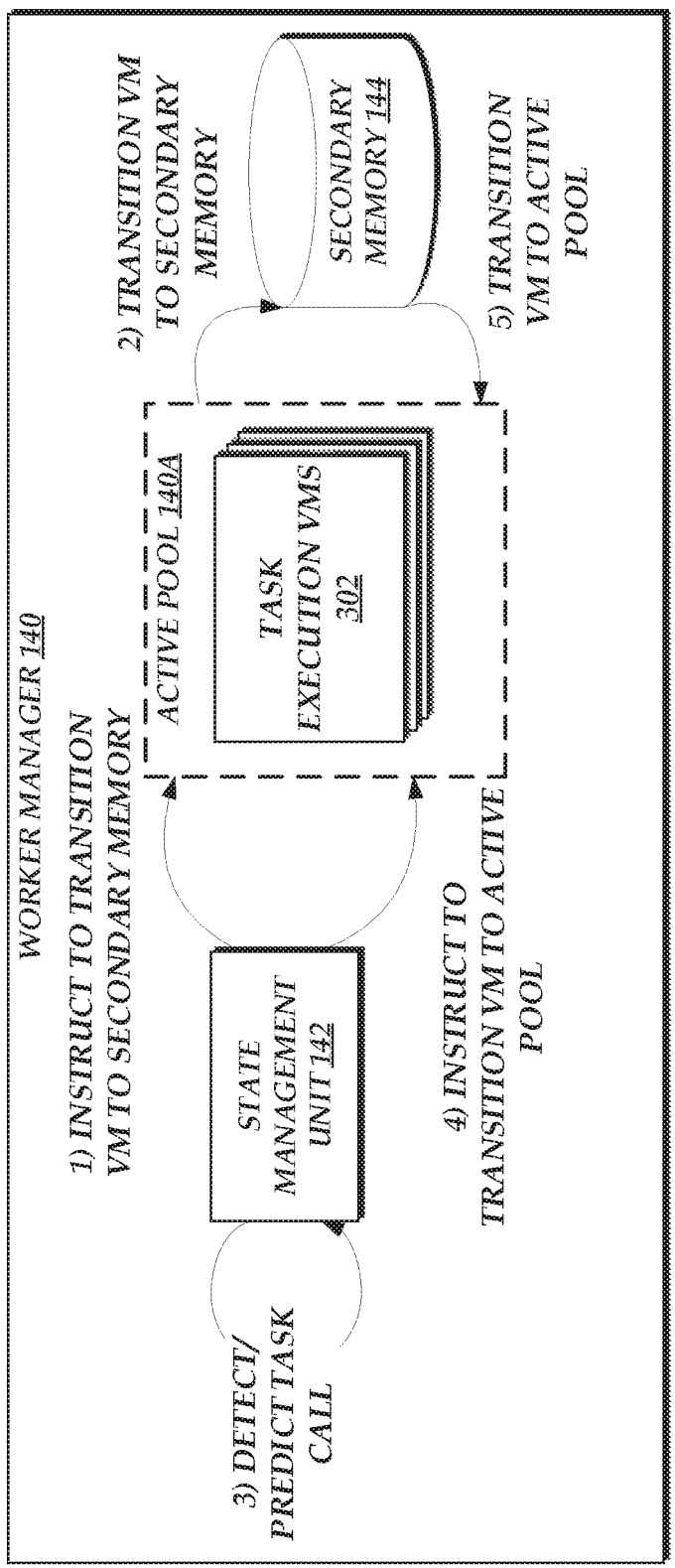
FIG. 4 is a flow diagram depicting illustrative interactions for altering the memory state of an execution environment to reduce computing resource usage of the on-demand code execution system of FIG. 1 while maintaining the ability of the system to rapidly execution of code within the environment.

Illustrative interactions for transitioning a VM 150 from the active pool 140A to a secondary memory 144A, and back into the active pool 140A to service an expected customer request, are depicted within FIG. 4. The interactions of FIG. 4 may illustratively occur subsequent to those of FIG. 4, after the state management unit 142 determines that a VM 150 should be transitioned from the active pool 140A to a secondary memory 144.

The interactions of FIG. 4 begin at (1), where the state management unit 142 transmits instructions to the active pool 140A to being transitioning a VM 150 from the active pool 140A to the secondary memory 144. In the context of FIG. 4, the transmission of instructions may correspond, for example, to software implementing the state management unit 142 transmitting a request to a hypervisor or other "DOM 0" or lower-level operating system to initiate snapshotting of the VM 150.

At (2), the active pool 140A transitions the VM 150 to secondary memory 144. Transitioning of the VM 150 can include, for example, storing a snapshot of the state of the VM 150 within the secondary memory 144. As noted above, the snapshot may be "cascading" and thus reference a prior snapshot of the VM 150 within the secondary memory 144 in order to minimize the data transfer required from a primary memory. Thereafter, the VM 150 can remain in secondary memory 144 until required (or expected to be required), reducing the overall computing resource usage of the worker manager 140.

Thereafter, at (3), the state management unit 142 can detect or predict a call to execute a task within the VM 150. Detecting such a call can for example correspond to receiving a request to execute the task, which request may have been transmitted by a user or system external to the on-demand code execution system 110. Predicting a call can for example correspond to detecting that the expected time of a next call (e.g., as used to determine whether to transition the VM 150 to secondary memory 144, illustrative interactions for which are described above with reference to FIG. 3) is imminently approaching, such that a transition-in phase for the VM 150 should begin to ensure that the VM 150 is ready to execute the task at the expected time of the next call.

In response to detecting or predicting a next call, the state management unit 142 at (4) instructs the active pool 140A to transition the VM 150 from the secondary memory 144 to the active pool 140A. In one embodiment, such instructions correspond to instructing a hypervisor or other host operating system to initialize the VM 150 based on a snapshot of the VM 150 within the secondary memory 144. At (5), the active pool 140A transitions the VM 150 to the active pool 140A, placing the VM 150 in an executing state. Thus, the VM 150 can be rendered ready to receive a call to execute the task at the expected time of that call, enabling total resources used on the worker manager 140 to be reduced relative to maintaining the VM 150 in the active pool 140A in an idle state, while minimally or not impacting responsiveness of the VM 150 to requests to execute the task.

Figure 5:
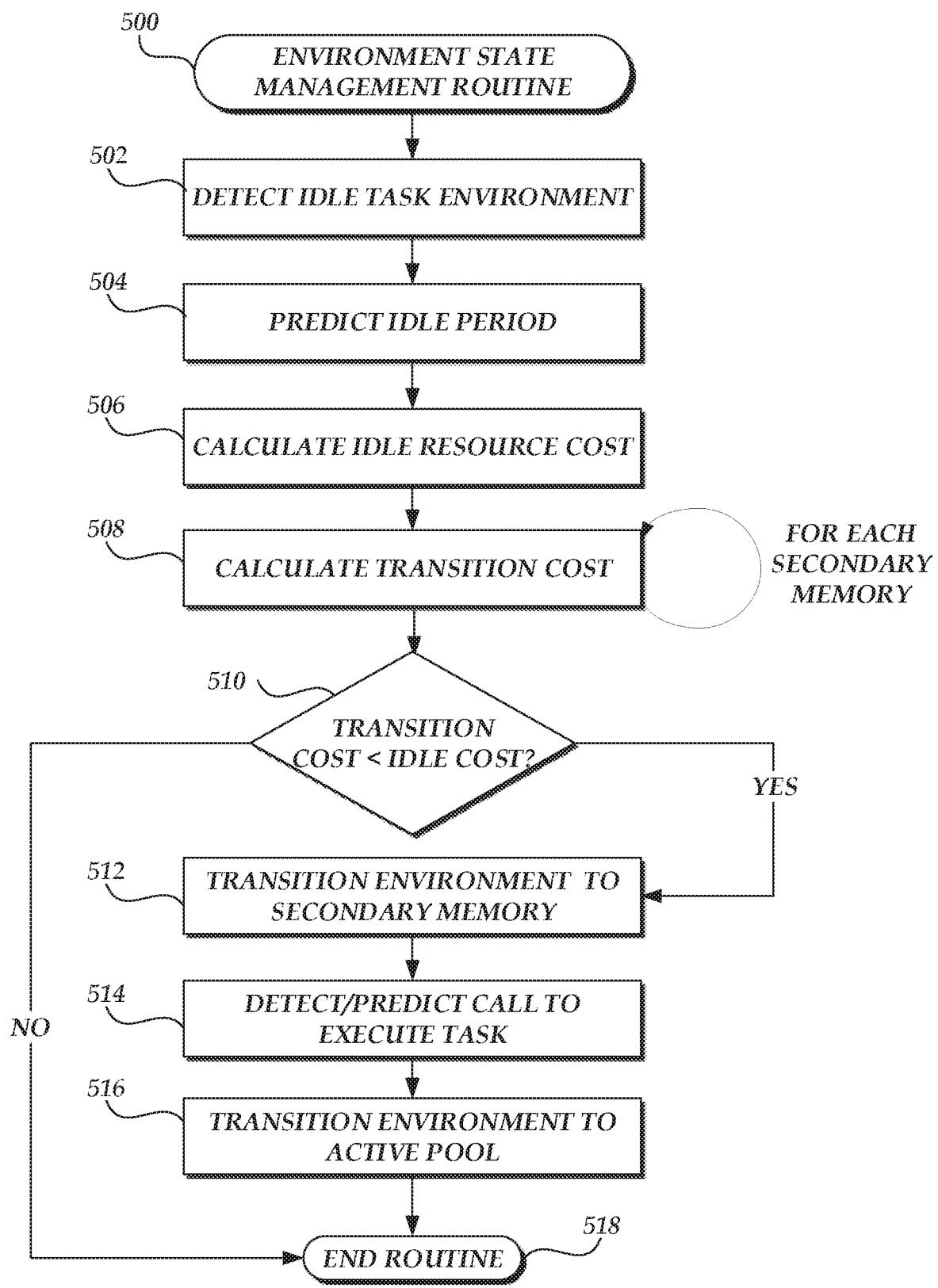
FIG. 5 is a flow chart depicting an illustrative routine for modifying a memory state of an execution environment within the on-demand code execution system of FIG. 1 based on an expected timing of a next execution of code provisioned within the execution environment.

With reference to FIG. 5 one illustrative routine 500 for managing a memory state of an execution environment, such as a VM 150, based on an expected next use of the environment to execute a task on the on-demand code execution system 110 will be described. The routine 500 may be carried out, for example, by the worker manager 140 of FIG. 1 (e.g., by use of the state management unit 142).

The routine 500 begins at block 502, where the worker manager 140 detects an idle environment associated with a task. Detection of an idle environment can correspond, for example, to detecting that an execution of the task has completed, and that no additional requests to execute the task are pending.

The routine 500 then continues to block 504, where the worker manager 140 predicts an idle period for the environment, corresponding to an amount of time until a next request to execute the task within the environment. As discussed above, the idle period may be predicted based on statistical analysis of call history information for a task. Illustratively, the idle period may be calculated from a past distribution of times between calls. For example, the idle period may be calculated such that there is a n % chance that a call is not received before the expiration of the idle period. In some instances, additional statistical analysis, such as a regression analysis, may be applied to determine an expected idle period based on other factors, such as a time-of-day. For example, call history may indicate that a given task is called frequently during business hours but infrequently during nighttime hours. A regression analysis of historical information can thus be used to determine a relationship between current time and a period between calls, which can be applied to a current time (e.g., a time of implementing the routine 500) to determine an expected next call to execute a task. In some instances, such statistical analysis may not be required, and other information may be used to predict a time of a next request to execute a task. For example, where the system 110 is configured to execute a task with a set periodicity (e.g., every minute), the idle period can be calculated from that periodicity, without requiring statistical analysis of historical calls.

The routine 500 continues to block 506, where the worker manager 140 determines an expected resource cost of maintaining the environment in an executing state within primary memory. As noted above, the resource cost may be represented as based on the "resource time" of each resource used to maintain the environment in an idle state (e.g., as a time-factored metric). For example, the RAM usage of an environment may be measured in "megabyte-seconds," or the amount of megabytes used to maintain the environment in an idle state multiplied by the seconds during which the megabytes would be used (e.g., assuming the predicted idle period is correct). As another example, CPU usage may be measured in CPU cycles, bandwidth may be measured in total data transferred, etc. In one embodiment, each resource time is weighted according to the value or scarcity of the resource and used to calculate an overall (e.g., resource agnostic) cost for maintaining the environment in an idle state.

Similarly, at block 508, the worker manager 140 determines an expected resource cost for transitioning the environment to secondary memory during an idle period, and back into primary memory at a time of a request to utilize the environment, or just prior to that request being expected. As with the cost of block 506, the transition cost may be calculated as a weighted combination of resource time for each resource used to transition the environment. Illustratively, the transition cost account for resources used to transfer out an environment from primary memory, maintain the environment in secondary memory, and transfer in the environment back into primary memory to execute code within the environment. Block 508 may be repeated for each potential secondary memory. As noted above, because the speed of each tier of secondary memory is expected to vary, the costs of transferring an environment to each tier is also expected to vary. However, these costs may not vary with any particular aspect of an environment, but rather with a combination of numerous factors, including the amount of data needed to be transferred for an environment (e.g., the "working set") and the expected time until next use of that environment.

At block 510 of the routine 500, the worker manager 140 conducts a comparison of the costs calculated in the above-noted blocks 506 and 508, and determines whether the cost to transition the environment to a secondary memory is less than the cost of maintaining the environment idle within primary memory. If block 510 evaluates to false, the routine 500 proceeds to block 518 and ends. This scenario illustratively corresponds to an instance in which a next call to utilize the environment is expected to come relatively quickly, and/or where the cost of transitioning the environment to a secondary memory is very high (e.g., the environment has a large working set of memory). In such an instance, maintaining the environment within primary memory may represent the most efficient use of resources on the system 110.

Alternatively, if block 510 evaluates to true, the routine 500 continues to block 512, where the worker manager 140 transitions the environment to the secondary memory associated with a lowest expected cost. Where the environment is a virtual machine, such a transition can include snapshotting the environment and storing the snapshot in the secondary memory. Where the environment is a software container or other software construct, such a transition can include checkpointing or "freezing" the environment and storing the checkpoint within the secondary memory.

Thereafter, at block 514, the worker manager 140 detects or predicts a call to execute the task associated with the environment. Detecting the call can correspond to receiving an instruction or request to execute the task. Predicting a call can correspond to determining that the predicted idle period of the environment (e.g., as determined at block 504) is nearing completion, such that a transition of the environment into primary memory should begin to enable the environment to be executing at the time when the predicted idle period ends. Thus, at block 516, the worker manager 140 transitions the environment back into primary memory, and sets the environment to executing within the active pool 140A. Where the environment is a virtual machine, transitioning the environment may include recreating the virtual machine from the snapshot. Where the environment is a software container or other construct, transitioning the environment may include restoring the container or construct from a checkpoint. In either instance, transitioning the environment may rely on functionality to transition data of the environment on an as needed basis, minimizing the amount of data that must be transmitted between the secondary memory and the primary memory to place the environment in a working state. The environment can then facilitate execution of a task within the environment.

Thus, by implementation of the routine 500, the overall computing resource usage of the system 110 with respect to an environment during an idle period can be reduced, while maintaining the ability of the system 110 to rapidly service requests to execute code within the environment. Indeed, where a subsequent request to utilize an environment is received at or after the expected next use of the environment, the total time of the system 110 to begin execution of a task is expected to be unchanged. However, because at least a portion of the idle time of the environment is spend stored in secondary memory, primary memory of the system 110 can be freed during that idle time to facilitate other executions of tasks. Thus, the overall capacity of the system 110 to execute tasks can be increased.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to selectively transition idle virtual machine instances into secondary memory of an on-demand code execution system, the system comprising:
   a data store including information associated with a history of requests to execute code on the on-demand code execution system; and
   a computing device configured with executable instructions to:
   detect that a virtual machine instance associated with the code is executing at least partly from a primary memory of a host device and that the virtual machine instance is in an idle state;
   estimating, from at least the history of calls to execute the code on the on-demand code execution system, an expected time of a next request to execute the code;
   calculate a first expected resource cost representing an expected resource cost on the host device of maintaining the virtual machine instance in an executing and idle state until the next request to execute the code, wherein the first expected resource cost includes at least a cost in terms of usage of the primary memory;
   calculate a second expected resource cost representing an expected resource cost on the host device of transitioning the virtual machine instance to secondary memory and returning the virtual machine instance to the primary memory prior to the expected
time of the next request to execute the code;
determine that the first expected resource cost exceeds
the second expected resource cost; and
transition the virtual machine instance from the primary
memory into the secondary memory.

2. The system of claim 1, wherein the primary memory is random access memory (RAM).

3. The system of claim 1, wherein the secondary memory is at least one of 3D XPoint memory, flash memory, or magnetic storage memory.

4. The system of claim 1, wherein the secondary memory is a given secondary memory among a plurality of secondary memories, and wherein the instructions further configure the computing device to:
calculate, for individual secondary memories of the plurality of secondary memories, an expected resource cost on the host device of transitioning the virtual machine instance to the individual secondary memories and returning the virtual machine instance to the primary memory prior to the expected time of the next request to execute the code; and
select the given secondary memory from the plurality of secondary memories based on the given secondary memory being associated with a lowest expected resource cost on the host device.

5. The system of claim 1, wherein the first expected resource code further includes at least a cost in terms of usage of a processing unit of the host device.

6. A computer-implemented method comprising:
detecting, within a primary memory of a host device on an on-demand code execution system, a virtual machine instance that is associated with execution of code and that is in an idle state;
predicting, from at least a history of calls to execute the code on the on-demand code execution system, an expected time of a next request to execute the code;
determining that an expected resource cost on the host device of maintaining the virtual machine instance in the primary memory in an idle state until the next request to execute the code exceeds a threshold value that is based on an expected resource cost on the host device of transitioning the virtual machine instance to secondary memory and returning the virtual machine instance to the primary memory prior to the expected time of the next request to execute the code; and
transitioning the virtual machine instance from the primary memory into the secondary memory.

7. The computer-implemented method of claim 6, wherein transitioning the virtual machine instance from the primary memory into the secondary memory comprises:
generating a snapshot of a current state of the virtual machine instance;
storing the snapshot in the secondary memory; and
removing the virtual machine from the primary memory.

8. The computer-implemented method of claim 7, wherein removing the virtual machine from the primary memory comprises halting execution of the virtual machine.

9. The computer-implemented method of claim 6 further comprising:
at a point in time prior to the expected time of the next request to execute the code, transitioning the virtual machine instance from the secondary memory into the primary memory;
receiving the next request to execute the code; and
executing the code within the virtual machine instance.

10. The computer-implemented method of claim 9, wherein transitioning the virtual machine instance from the secondary memory into the primary memory comprises regenerating the virtual machine instance based at least in part on a snapshot of the virtual machine instance stored within the secondary memory.

11. The computer-implemented method of claim 9, wherein transitioning the virtual machine instance from the secondary memory into the primary memory comprises transferring a minimum portion of data of the virtual machine instance that is required to execute the virtual machine instance from the secondary memory to the primary memory, and wherein additional portions of the data of the virtual machine instance are transferred from the secondary memory to the primary memory on request by the virtual machine instance.

12. The computer-implemented method of claim 6 further comprising:
receiving the next request to execute the code prior the expected time of the next request;
transitioning the virtual machine instance from the secondary memory into the primary memory in response to receiving the next request; and
executing the code within the virtual machine instance.

13. Non-transitory computer-readable storage media comprising computer-executable instructions that, when executed on a computing system, cause the computing system to:
detect, within a primary memory of a host device on an on-demand code execution system, an execution environment that is associated with execution of code and that is in an idle state;
determine, from at least a history of calls to execute the code on the on-demand code execution system, an expected time of a next request to execute the code;
determine that an expected resource cost on the host device of maintaining the execution environment in the primary memory in an idle state until the next request to execute the code exceeds an expected resource cost on the host device of transitioning the execution environment to secondary memory and returning the virtual machine instance to the primary memory prior to the expected time of the next request to execute the code; and
transition the execution environment from the primary memory into the secondary memory.

14. The non-transitory computer-readable storage media of claim 13, wherein the expected resource cost on the host device of transitioning the execution environment to secondary memory and returning the virtual machine instance to the primary memory prior to the expected time of the next request to execute the code comprises a combination of:
an expected resource cost to transition the execution environment from the primary memory to the secondary memory;
an expected resource cost to transition the execution environment from the secondary memory to the primary memory; and
an expected resource cost to maintain the execution environment in the secondary memory subsequent to transitioning the execution environment from the primary memory to the secondary memory and prior to transitioning the execution environment from the secondary memory to the primary memory.

15. The non-transitory computer-readable storage media of claim 14, wherein the expected resource cost to transition the execution environment from the primary memory to the secondary memory comprises an expected resource cost to transfer a working set of data for the execution environment into the secondary memory.

16. The non-transitory computer-readable storage media of claim 15, wherein the execution environment is stored within the secondary memory at least partly with reference to a prior snapshot of the execution environment in the secondary memory and data indicating a state of the working set of data for the execution environment.

17. The non-transitory computer-readable storage media of claim 14, wherein the expected resource cost to transition the execution environment from the primary memory to the secondary memory is calculated as a weighted combination of time-factored costs corresponding to each resource required to transition the execution environment from the primary memory to the secondary memory.

18. The non-transitory computer-readable storage media of claim 17, wherein weights of individual time-factored costs are set based at least partly on an availability of a corresponding resource required to transition the execution environment from the primary memory to the secondary memory.

19. The non-transitory computer-readable storage media of claim 13, wherein the expected time of the next request is calculated as a time before which there is a statistical percentage likelihood that a next request to execute the code will not occur.

20. The non-transitory computer-readable storage media of claim 19, wherein the instructions, when executed on a computing system, cause the computing system to calculate the expected time of the next request based at least partly on statistical analysis of a distribution of times between individual calls to execute the code reflected within the history of calls.

* * * * *

UNITED STATES PATENT AND TRADEMARK OFFICE
CERTIFICATE OF CORRECTION

PATENT NO. : 10,713,080 B1
APPLICATION NO. : 16/045584
DATED : July 14, 2020
INVENTOR(S) : Marc John Brooker et al.

Page 1 of 1

It is certified that error appears in the above-identified patent and that said Letters Patent is hereby corrected as shown below:

In the Drawings

In sheet 3 of 5, FIG. 3, Line 10 approx., delete "TRANSISTION" and insert --TRANSITION--.

In sheet 3 of 5, FIG. 3, Line 13 approx., delete "TRANSISTIONED" and insert --TRANSITIONED--.

In the Specification

In Column 4, Line 3, delete "3D) (POINT" and insert --3D XPOINT--.

In the Claims

In Column 27, Line 10, Claim 3, delete "3D XPoint memory," and insert --3D XPOINT memory,--.

In Column 27, Line 29, Claim 5, delete "code" and insert --cost--.

In Column 28, Lines 41-42, Claim 13, delete "virtual machine instance" and insert --execution environment--.

In Column 28, Lines 50-51, Claim 14, "virtual machine instance" and insert --execution environment--.

Signed and Sealed this
Fifteenth Day of December, 2020

Andrei Iancu
*Director of the United States Patent and Trademark Office*